(12) United States Patent
Martinez et al.

(10) Patent No.: US 12,410,786 B2
(45) Date of Patent: Sep. 9, 2025

(54) BOOSTER PUMP CONTROLLER AND METHOD OF USE

(71) Applicant: Tigerflow Systems, LLC, Dallas, TX (US)

(72) Inventors: Mark Marvin Martinez, Mansfield, TX (US); Demetrio Velasco Pinones, Grand Prairie, TX (US); Parsa Tahamzadeh, Dallas, TX (US); Minh Dinh Truong, Garland, TX (US)

(73) Assignee: Tigerflow Systems, LLC, Dallas, TX (US)

( * ) Notice: Subject to any disclaimer, the term of this patent is extended or adjusted under 35 U.S.C. 154(b) by 126 days.

(21) Appl. No.: 18/453,820

(22) Filed: Aug. 22, 2023

(65) Prior Publication Data

US 2025/0067259 A1 Feb. 27, 2025

(51) Int. Cl.
*F04B 49/06* (2006.01)
*E03B 5/02* (2006.01)
(Continued)

(52) U.S. Cl.
CPC .............. *F04B 49/065* (2013.01); *E03B 5/02* (2013.01); *E03B 7/075* (2013.01); *F04B 17/03* (2013.01); *F04B 23/04* (2013.01); *F04B 49/02* (2013.01); *F04B 49/20* (2013.01); *G05B 13/04* (2013.01); *G05D 16/2066* (2013.01); *F04B 2203/0204* (2013.01); *F04B 2205/05* (2013.01); *F04B 2205/09* (2013.01); *F04D 13/14* (2013.01);
(Continued)

(58) Field of Classification Search
CPC ........ F04B 49/065; F04B 49/02; F04B 49/20; F04B 17/03; F04B 23/04; F04B 2203/0204; F04B 2205/0509; E03B 5/02; E03B 7/075; G05B 13/04; G05D 16/2066; F04D 13/14; F04D 15/0066; F04D 15/029
USPC ......................................................... 417/5–7
See application file for complete search history.

(56) References Cited

U.S. PATENT DOCUMENTS 3,639,081 A  2/1972  Gray et al.
4,290,735 A  9/1981  Sulko
(Continued)

FOREIGN PATENT DOCUMENTS

CN   111927745 A  * 11/2020
GB   2293403 B    11/1997
(Continued)

OTHER PUBLICATIONS

Huong, Nguyen Lan, et al. "Optimization to water supply system design andoperation scheme in high rise buildings." Journal of Science and Technology inCivil Engineering (STCE)-HUCE 12.3 (2018): 123-131.
(Continued)

*Primary Examiner* — Charles G Freay
(74) *Attorney, Agent, or Firm* — Schultz & Associates, P.C.

(57) ABSTRACT

The disclosure provides a controller and server combination, which implements a set of software programs to control a booster pump system. In a preferred embodiment, the software derives quadratic models for the pump performance curves, and the system curve. The system monitors the flow rate of the system, the pump performance curve model and the system curve model to adjust the drive frequency and the number of active pumps to meet flow rate demand efficiency.

30 Claims, 14 Drawing Sheets

(51) Int. Cl.
*E03B 7/07* (2006.01)
*F04B 17/03* (2006.01)
*F04B 23/04* (2006.01)
*F04B 49/02* (2006.01)
*F04B 49/20* (2006.01)
*G05B 13/04* (2006.01)
*G05D 16/20* (2006.01)
*F04D 13/14* (2006.01)
*F04D 15/00* (2006.01)
*F04D 15/02* (2006.01)

(52) U.S. Cl.
CPC ........ *F04D 15/0066* (2013.01); *F04D 15/029* (2013.01)

(56) References Cited

U.S. PATENT DOCUMENTS

| | | | |
|---|---|---|---|
| 4,799,864 | A | 1/1989 | Hockley |
| 4,897,022 | A | 1/1990 | Hudson |
| 5,540,555 | A | 7/1996 | Corso et al. |
| 6,715,691 | B2 | 4/2004 | Park et al. |
| 7,308,906 | B2 | 12/2007 | Sinclaire |
| 9,091,259 | B2 * | 7/2015 | Tamminen ............... F04B 23/04 |
| 9,181,953 | B2 * | 11/2015 | Steger ................ F04D 15/0066 |
| 11,243,512 | B2 * | 2/2022 | Kallesøe .............. G05B 19/416 |
| 11,268,265 | B2 | 3/2022 | Whitelaw |
| 11,359,623 | B2 | 6/2022 | Dissing |
| 11,668,594 | B2 * | 6/2023 | Patel ................... F04D 15/0088 |
| | | | 73/168 |
| 2024/0402681 | A1 * | 12/2024 | Housh ................. G05B 19/416 |

FOREIGN PATENT DOCUMENTS

| | | |
|---|---|---|
| JP | 2010275688 A | 12/2010 |
| JP | 5412173 B2 | 2/2014 |
| KR | 101380093 B1 | 4/2014 |
| KR | 20170107850 A | 9/2017 |
| TW | 1818807 B * | 10/2023 |

OTHER PUBLICATIONS

Altherr, Lena C., et al. "Resilient layout, design and operation of energy-efficientwater distribution networks for high-rise buildings using MINLP." Optimizationand Engineering 20.2 (2019): 605-645.

Müller, Tim Moritz, et al. "Systemic Optimization of Booster Stations—From Data Collection to Validation." (2019).

Londono, Cesar Diaz; Ruiz, Fredy; Patino, Diego. "Modeling and control of water booster pressure systems as flexible loads for demand response." (2017).

* cited by examiner

BOOSTER PUMP CONTROLLER AND METHOD OF USE

FIELD OF THE INVENTION

The field of the invention is booster pump systems for large buildings where the street level head pressure is insufficient to drive the required head pressure for the building.

BACKGROUND OF THE INVENTION

Energy efficiency in building standard has long been a priority in the United States. The result is that many standards in building code have evolved to stress energy efficiency.

One such standard is Standard 90.1 promulgated by the American Society of Heating, Refrigerating and Air Conditioning Engineers ("ASHRAE"). The development of Standard 90.1 began in the aftermath of the 1970's energy crisis in the United States. At that time, the building energy standard offered minimum construction requirements for buildings, building envelopes and the majority of other mechanical and lighting systems in new buildings.

In 2019, ASHRAE 90.1 was amended to include drastic changes such as defining how water pump systems should be designed in order to save energy. Variable speed drives were also required in all systems and all secondary pumps were required to "ride" the pump efficiency curve.

Even by 2023, most pump systems are not designed to ride the pump efficiency curve as required by ASHRAE 90.1. Rather, they are oversized and rarely operate at their full design capacity. Throttling valves are employed to reduce flow when the process flow requirements are less than the flow at the pumping system's natural operating point. Throttling valves control flow by increasing the system's back pressure or resistance to flow. This increased pressure shifts the pump operating point along its performance curve, and typically away from its point of highest efficiency, which results in a loss of pump efficiency.

The prior art has attempted to address efficiency in booster pump systems in a number of ways, but all have fallen short.

U.S. Pat. No. 11,359,623 to Dissing discloses controlling the boost pump of a pressure raising device in water supply networks by reducing the lower limit value in which maximum output pressure is below the lower limit value during operation of the pump.

U.S. Pat. No. 6,715,691 to Park, et al. discloses a multi-stage pressure distribution and regulation system for very high-rise buildings.

U.S. Pat. No. 5,540,555 to Corso, et al. discloses a real-time remote sensing pressure control system for hydronic water system with periodically sampled remote sensors in building automation data generates bias signal to modify base setpoint of PI controller that controls the pumps.

U.S. Pat. No. 3,639,081 to Gray, et al. discloses pressure maintained at a constant level for all values of flow by pressure-regulating valves between each of the pumps in a tankless pumping system.

U.S. Pat. No. 4,290,735 to Sulko discloses a water pressure booster system with auxiliary booster pump(s) above a main pump feeding accumulator tank to release water into the piping system.

U.S. Pat. No. 4,799,864 to Hockley, discloses a packaged pumping system for the plurality of pumps, which are brought into operations sequentially as water pressure in the system drops below a preset value. A prime is maintained on the pumps by a foot valve in the suction pipe inlet, and a number of accumulators, to maintain reservoir pressure when the pumps are inoperative.

Hence, there remains a need for a pump control system which meets or exceeds ASHRAE 90.1 efficiency standards.

SUMMARY OF THE INVENTION

The disclosure provides a controller and server combination, which implements a set of software programs to control a booster pump system. In a preferred embodiment, the software derives quadratic models for the pump performance curves, and the system curve. The system monitors the flow rate of the system, the pump performance curve model and the system curve model to adjust the drive frequency and the number of active pumps to meet flow rate demand efficiently.

BRIEF DESCRIPTION OF THE DRAWINGS

In the detailed description of the preferred embodiments presented below, reference is made to the accompanying drawings.

DETAILED DESCRIPTION OF THE INVENTION

In the description that follows, like parts are marked throughout the specification and figures with the same numerals, respectively. The figures are not necessarily drawn to scale and may be shown in exaggerated or generalized form in the interest of clarity and conciseness. The word "about", unless otherwise specified, means a tolerance of ±5%.

Figure 1:
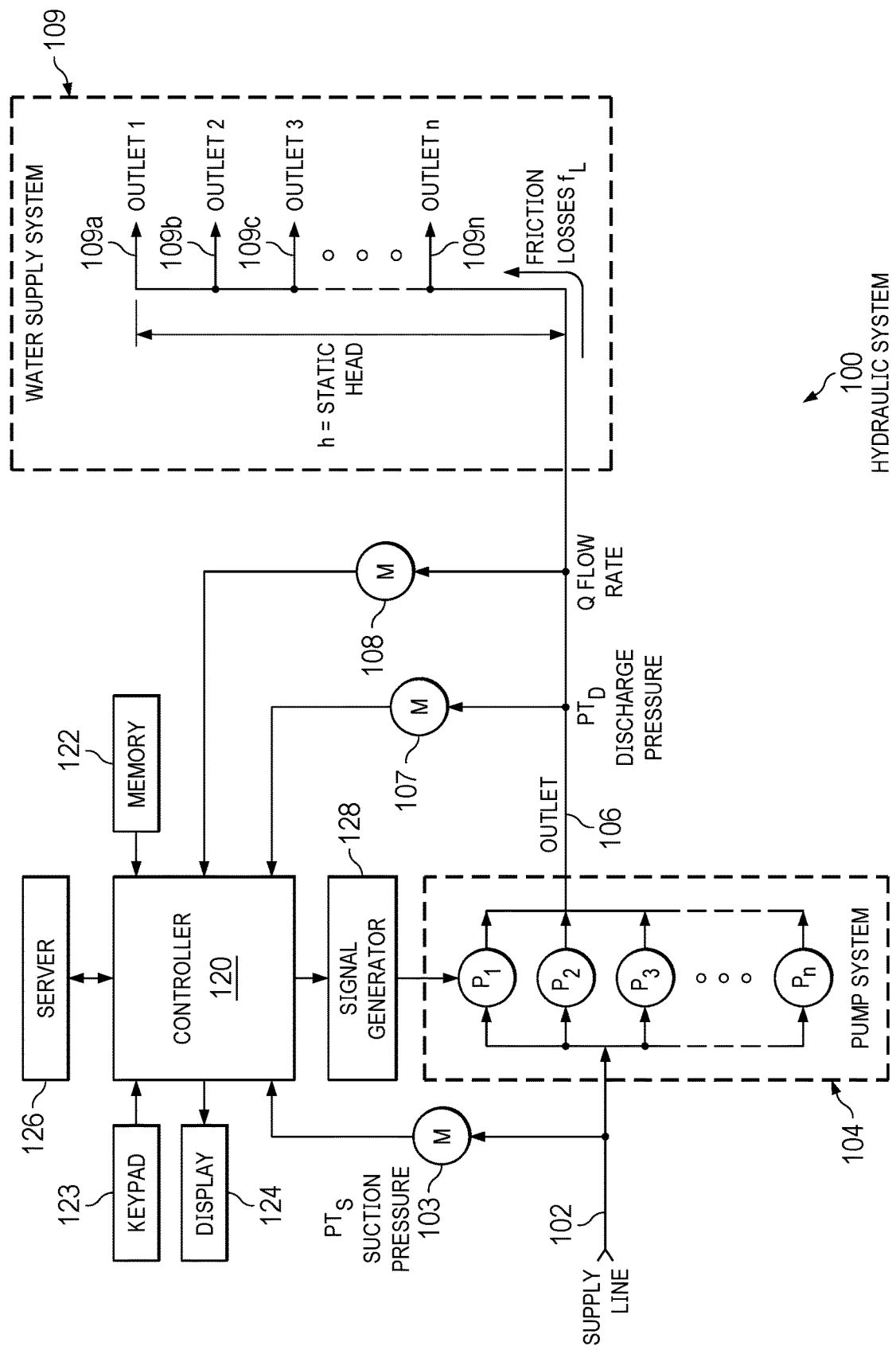
FIG. 1 is an architecture diagram of a preferred hydraulic system.

Referring then to FIG. 1, hydraulic system 100 will be further described.

Hydraulic system 100 includes supply line 102. Supply line 102 provides water to pump system 104 and includes inline pressure meter 103. Pressure meter 103 provides an indication of suction pressure "$PT_S$", present in the supply line.

Pump system 104 includes a number of booster pumps such as, $P_1, P_2, P_3 \ldots P_N$ arranged in parallel. In a preferred embodiment, each of the pumps is a variable speed drive Gould model number 33SV-6/2 available from ITT Goulds Pumps Inc of Seneca Fallas, New York. Pump system 104 is connected to outlet 106. Outlet 106 includes discharge pressure meter 107, which monitors discharge pressure "$PT_D$," and flow meter 108, which measures flow rate "Q", in gallons per minute. Outlet 106 supplies water supply system 109 having outlets 109a, 109b, 109c, . . . 109n at static head "$f_T$" with friction losses "$f_L$."

Controller 120 is operatively connected to each of meters 103, 107 and 108 and derives data readings from them representing $PT_S$, $PT_D$ and Q, respectively.

Each of the pumps is operatively connected signal generator 128. Signal generator 128 provides a variable frequency drive signal to each of the pumps in the pump system. Signal generator 128 is operatively connected to and controlled by controller 120.

Controller 120 is further operatively connected to memory 122 and display 124. Memory 122 stores instructions that are executed by controller 120 to interpret signals from the meters and provide control signals to signal generator 128. In a preferred embodiment, controller 120 is the ACH580 drive available from ABB Ltd. of Zurich, Switzerland.

In a preferred embodiment, controller 120 is also operatively connected to server 126 and is capable of sending status data to server 126 and receiving control instructions from server 126, as will be further described. Controller 120 is also operatively connected to keypad 123 and may receive instructions through it. Controller 120 is also operatively connected to display 124, which is used to indicate system status, as will be further described.

In a preferred embodiment, server 126 is preferably a pooled centralized server resource that is accessed through the internet. Local memory is provided which is used to store instructions for the server to implement.

Each hydraulic system, such as hydraulic system 100, may be characterized by a pump performance curve and a system curve.

Figure 2A:
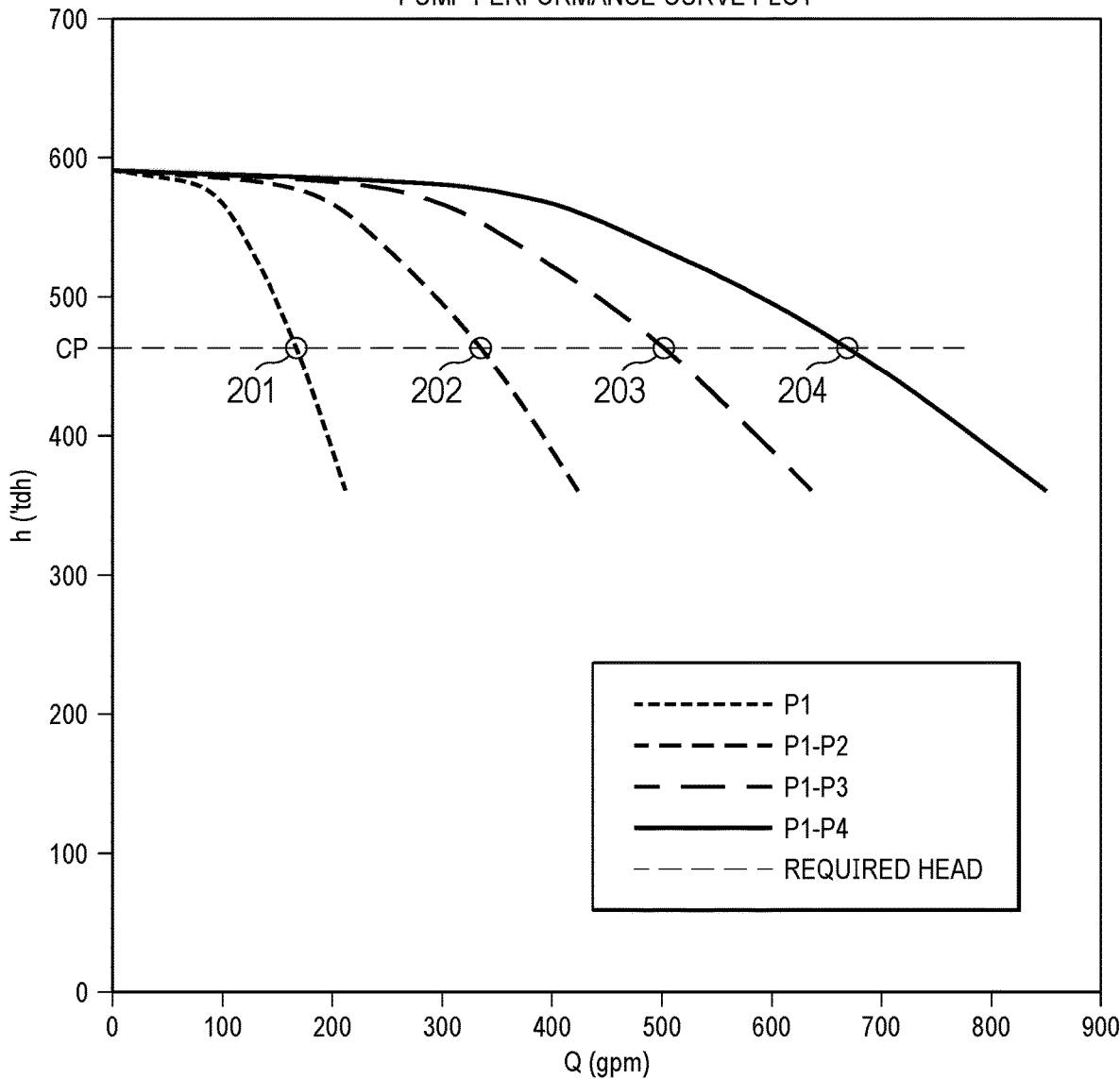
FIG. 2A is a plot for a series of example empirical pump performance curves.

Referring to FIG. 2A, pump performance curve plot 200 of a typical set of empirical pump performance curves for hydraulic system 100 will be further described. In general, in the prior art, pump performance curves are derived from empirical measurements of the available head from the pumps across a range of given flow rates. For variable speed pumps, the pump performance curves are supplied as data tables, typically from the manufacturer, the data tables usually include values for head "h", flow rate "Q" and drive frequency "f" for each pump, over a range of operating frequencies.

Pump performance curve plot 200 is a graphical representation of the head generated, "h" by various pump combinations at flow rate, "Q", from zero to maximum at a given operating pump speed. Pump performance curve plot 200 shows the amount of pressure developed across a range of flow rates. The y-axis denotes the pressure developed, typically converted to head in feet. The x-axis denotes the flow rate, Q, in gallons per minute (GPM).

In this example, pump performance curve plot 200 depicts pump performance curves for four pumps connected in parallel. The first curve P1 indicates the pump performance curve for P1 operating alone. Likewise, curve P1-P2 indicates the pump performance curve for pumps 1 and 2, operating in parallel. In the same way, pump performance curve P1-P3 shows the performance of pumps 1, 2, and 3 operating in parallel. Pump performance curve P1-P4 shows the performance of pumps 1, 2, 3, and 4 operating in parallel.

Typically, pump systems are designed to meet a required head pressure in a water supply system. The required head must be maintained at a constant regardless of the flow rate required.

In this example, the required head or "control point", "CP", is approximately 475 feet. At point 201, as the flow rate approaches 170 GPM, the pump performance curve P1 shows that pump 1 becomes inadequate to meet the required head therefore, pump 2 must be activated to boost the head pressure. At point 202, as the required flow rate approaches 340 GPM, the parallel combination of pumps 1 and 2 becomes inadequate and the activation of pump 3 becomes required. In the same way, at point 203, as the required flow rate approaches 500 GPM, combination of pumps 1 through 3 is insufficient to meet the required head, thus requiring the activation of pump 4. Combination of pumps 1 through 4 in this example system is sufficient to meet the required head up to 675 GPM, shown at point 204.

Importantly, in the prior art, the control point is a fixed number which does not vary regardless of the required flow rate. The control point is used by controllers of the prior art to activate and deactivate pumps in the system to meet the required head.

In general, a system curve is a graphical representation of the relationship between flow rate and the associated head losses in a hydraulic system. As flow rate increases, so does the head loss. The system curve may be derived by measuring the total head losses at various flow rates and plotting them on a common set of axes. In systems where the elevation change, or static head, is the majority of the overall head loss, the system curve is typically relatively flat. The total head loss at any given flow rate consists of static head and dynamic head. The dynamic head consists of frictional head losses and component head losses.

Figure 2B:
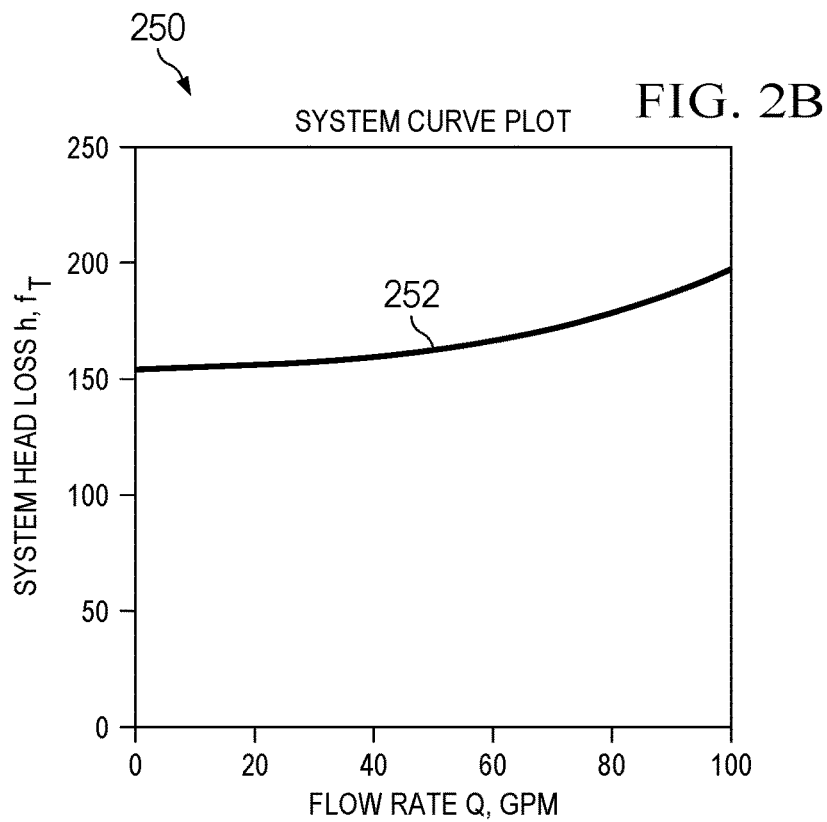
FIG. 2B shows an exemplary system curve plot.

Referring then to FIG. 2B, a typical hydraulic system curve for hydraulic system 100 will be further described.

In this example, system curve plot 250 indicates an initial head pressure of 160 feet at 0 flow rate. Curve 252 gradually increases reflecting system losses of 200 feet at a flow rate of approximately 100 GPM.

The system curve may be derived by use of the static head equation and the Hazen-Williams equation.

The static head equation typically used is as follows:

$$\Delta h_{stat} = (z_{destination} - z_{supply}) + \frac{(P_{destination} - P_{supply})}{\rho g}$$

Where:
z=elevation, in feet;
P=pressure, in psi;
p=fluid density, in lbrn/ft$^3$; and
g=gravitational acceleration, 32.2 ft/s$^2$.

Employing the Hazen-Williams equation, the total head losses at any given flow rate is the sum of the static head, frictional losses and component losses of the system may be derived according to the following equation:

$$S_{psi\ per\ foot} = \frac{P_d}{L} = \frac{4.52 Q^{1.852}}{C^{1.852} d^{4.8704}}$$

Where:

$S_{psi\ per\ foot}$=frictional resistance (pressure drop per foot of pipe) in psig/ft (pounds per square inch gauge pressure per foot);

Pd=pressure drop over the length of pipe in psig (pounds per square inch gauge pressure);

L=length of pipe in feet;

Q=flow, GPM;

C=pipe roughness coefficient; and d=inside pipe diameter, inches.

Using the empirically derived pump curves of the prior art in a modern control algorithm is difficult and slow, therefore, the inventor realized that modeling the pump performance curves is necessary to implement an efficient control algorithm.

Likewise, the Hazen-Williams equation is difficult to use in rapid software calculations. So much so that in the prior art, the system curve is assumed to be a flat line constant valve known as a "control point". This assumption creates inefficiency in the system. Therefore, in a preferred embodiment, the inventors have also chosen to model the system curve.

Figure 3:
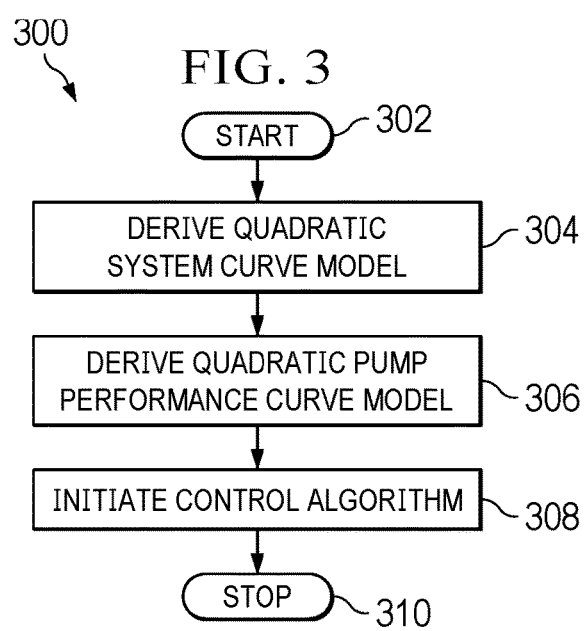
FIG. 3 is a method of a preferred embodiment.

Referring then to FIG. 3, method 300 of implementing a pump control algorithm, will be further described. In a preferred embodiment, the method comprises a Python program resident in memory of the server carries out the steps, as will be further described.

At step 302, the method begins.

At step 304, the server derives a quadratic model for the system curve, as will be further described.

At step 306, the server derives quadratic models for the pump performance curves based on the empirical pump performance curves, as will be further described.

At step 308, the server initiates a control algorithm in controller 120 which operates pump system 104, as will be further described.

At step 310, the method concludes.

Figure 4A:
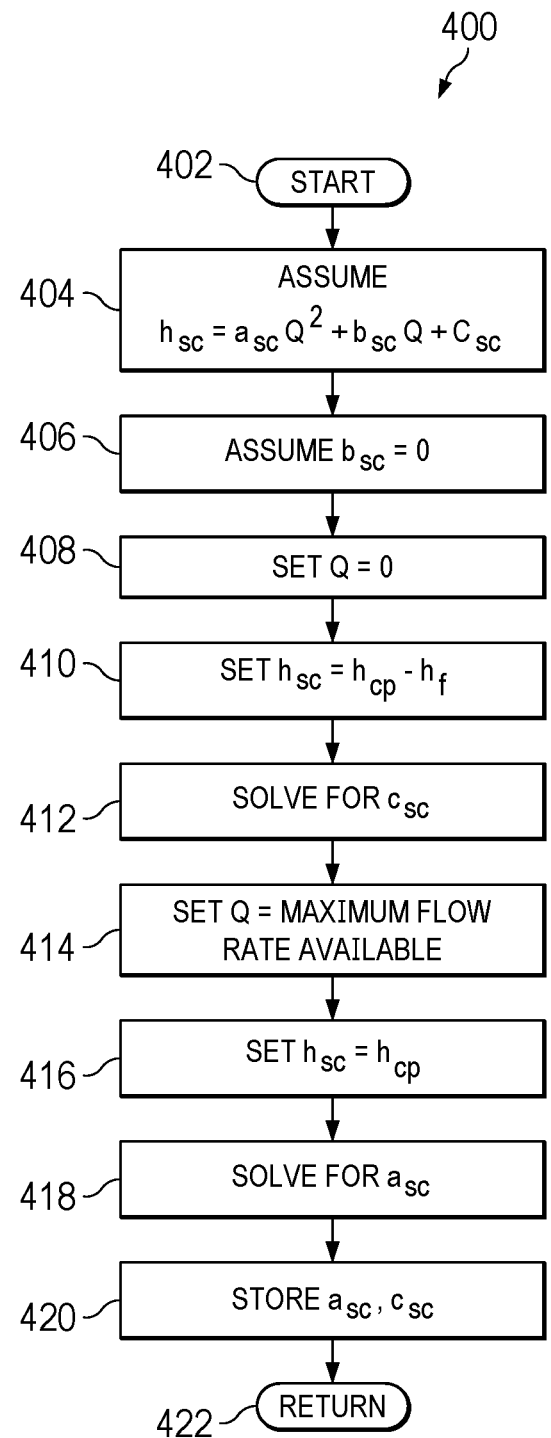
FIG. 4A the preferred embodiment of a method of quadratically modeling a system curve.

Referring to FIG. 4A, method 400, which implements step 304 of deriving a quadratic system curve model will be further described. The method is preferably accomplished at the server, using a Python program.

At step 402, the method begins.

At step 404, is assumed that the head and flow rate for the system curve obeys a second order polynomial of the following form:

$$h_{sc} = a_{sc} Q^2 + b_{sc} Q + c_{sc}$$

Where:

$h_{sc}$=the head for the system curve;

Q=the flow rate; and $a_{sc}$, $b_{sc}$ and $c_{sc}$=quadratic system curve coefficients.

At step 406, coefficient $b_{sc}$ is set equal to 0, based on the assumption that there is no constant flow loss in the system. This is a reasonable assumption due to ASHRAE efficiency considerations which eliminate throttling and other constant flow losses.

At step 408, Q is set to 0 for a no flow condition.

At step 410, the "$h_{sc}$" is set to the required head for the system, or "head condition point", "$h_{cp}$" less the friction loss of the system, "$h_f$", according to the following equation:

$$h_{sc} = h_{cp} - h_f$$

Where:

$h_{sc}$=is the head for the system curve;

$h_{cp}$=is the required system head; and $h_f$=friction loss in the system.

In a preferred embodiment, friction loss in the system is a measured quantity that is resident in memory.

At step 412, the system coefficient $c_{sc}$ is determined to be equal to $h_{sc}$ because Q=0.

At step 414, flow rate, "Q", is set to the maximum flow rate available, "$Q_{max}$". In one example, the maximum flow rate available is derived by multiplying the maximum flow rate for one pump by the number of pumps active in the system.

At step 416, $h_{sc}$ is set equal to the required head for the system, $h_{cp}$.

At step 418, the system coefficient $a_{sc}$ may be solved for given that the flow rate, "Q", is known, and the required head, $h_{cp}$ is known, the system coefficient $c_{sc}$, has been determined (in step 412) and the assumption that $b_{sc}$ is equal to 0, according to the following equation:

$$a_{sc} = \frac{h_{cp} - c_{sc}}{Q_{max}^2}$$

Where:

$a_{sc}$, $c_{sc}$=quadratic coefficients;

$h_{cp}$=required system head; and $Q_{max}$=maximum flow rate.

At step 420, the system coefficients $a_{sc}$ and $c_{sc}$ are stored in memory. These coefficients will be used in the quadratic form as follows to model the system curve.

$$h_{sc} = a_{sc} Q^2 + c_{sc}$$

Where:

$h_{sc}$=the head for the system curve;

Q=the flow rate; and $a_{sc}$ and $c_{sc}$ quadratic system curve coefficients.

At step 422, the method concludes.

Data for an example system curve is shown below in Table 1.

TABLE 1

| | | |
|---|---|---|
| Head, condition point | $h_{cp}$ | 462.0 ft. |
| Flow, condition point | $Q_{max}$ | 670.5 gal. |
| Head, friction loss | $h_{fl}$ | 8.0 psi |
| Head, no-flow | $h_{nf}$ | 425.0 ft. |
| a coefficient, system curve | $a_{sc}$ | 8.2205E−05 |
| c coefficient, system curve | $c_{sc}$ | 425.04 |

Data points from an exemplary quadratic system curve model for a single pump active, pump 1, are shown below in Table 2.

TABLE 2

| Curve Points P1 | Flow gpm | Head ft |
|---|---|---|
| 1 | 0.0 | 425.0 |
| 2 | 268.2 | 431.0 |
| 3 | 402.3 | 438.3 |
| 4 | 536.4 | 448.7 |
| 5 | 670.5 | 462.0 |

Figure 4B:
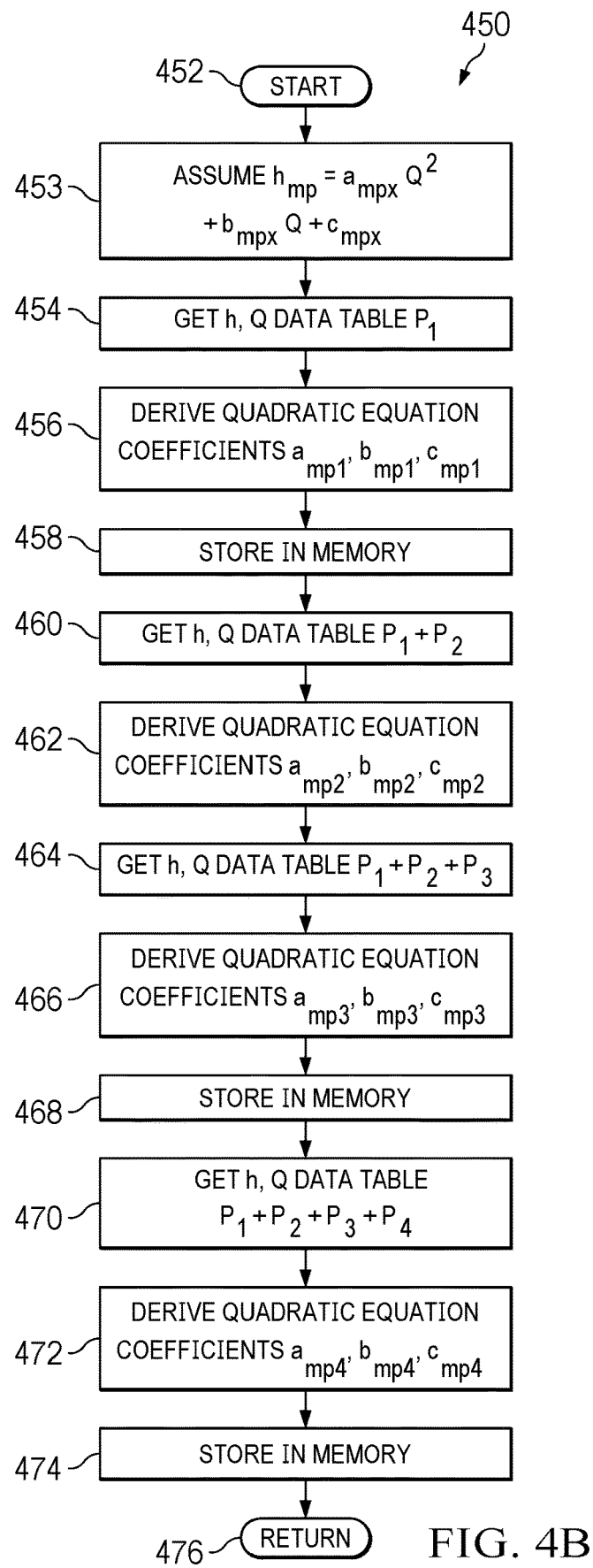
FIG. 4B is a preferred embodiment of a method of quadratically modeling a set of pump performance curves.

Referring to FIG. 4B, method 450, which implements step 306 of deriving a quadratic pump performance curve model, based on empirical data tables, will be further described.

At step 452, the method begins.

At step 453, it is assumed that the head and flow rate for the pump performance curve obeys a second order polynomial of the following form:

$$h_{mp} = a_{mpx}Q^2 + b_{mpx}Q + c_{mpx}$$

Where:
$h_{mp}$=head pressure;
$a_{mpx}$, $b_{mpx}$, $c_{mpx}$=are quadratic coefficients for pump combination x; and
Q=flow rate.

At step 454, the server imports an empirically derived data table for pump 1, including values for head, "h", and flow rate, "Q", at a maximum drive frequency, "f". A preferred embodiment of the data table includes five values for each of head and flow rate for pump 1 running alone. The maximum drive frequency is about 60 Hz.

At step 456, a curve fit function is used to derive coefficients for the quadratic equation, which statistically fits the curve provided by the data table. In a preferred embodiment, the curve fit is accomplished by the server using the Python function "SciPy". Of course, other curve fit routines may be employed with the equal success. The root mean squared error, or fit standard error, is preferably between about 0 and about 0.2.

At step 458, the quadratic equation coefficients, $a_{mp1}$, $b_{mp1}$ and $c_{mp1}$, for pump 1, are stored in memory.

At step 460, an empirical data table is imported which provides values of "h" and "Q" at maximum drive frequency "f" for a combination of pump 1 and pump 2, connected in parallel.

At step 462, the curve fit routine is used to derive quadratic equation coefficients, $a_{mp2}$, $b_{mp2}$ and $c_{mp2}$ for a quadratic equation which statistically fits the empirical data provided by the data table for pumps 1 and 2.

At step 464, an empirical data table is imported which provides values of "h" and "Q" at maximum drive frequency "f" for pumps 1, 2 and 3 connected in parallel.

At step 466, quadratic equation coefficients, $a_{mp3}$, $b_{mp3}$ and $c_{mp3}$, are derived from the curve fit routine for the imported data table.

At step 468, the quadratic equation coefficients, $a_{mp3}$, $b_{mp3}$ and $c_{mp3}$, are stored in memory.

At step 470, an empirical data table is imported which provides values for "h" and "Q" at maximum drive frequency "f" for pumps 1, 2, 3 and 4 running in parallel.

As step 472, quadratic equation coefficients, $a_{mp4}$, $b_{mp4}$ and $c_{mp4}$, are derived to fit the empirical data provided by the data table.

At step 474, the quadratic equation coefficients, $a_{mp4}$, $b_{mp4}$ and $c_{mp4}$, are stored in memory.

At step 476, the method returns.

An example of empirical data tables imported for pump system 104 is shown in Table 3.

TABLE 3

| Example Data Points | Head ft | FlowP1 GPM | FlowP1_P2 GPM | FlowP1_P3 GPM | FlowP1_P4 GPM |
|---|---|---|---|---|---|
| 1 | 594.0 | 0.0 | 0.0 | 0.0 | 0.0 |
| 2 | 581.8 | 60.0 | 120.0 | 180.1 | 240.1 |
| 3 | 552.0 | 110.1 | 220.1 | 330.2 | 440.2 |
| 4 | 486.0 | 160.0 | 319.9 | 479.9 | 639.8 |
| 5 | 355.2 | 212.1 | 424.3 | 636.4 | 848.5 |

An example of a quadratic equation coefficient table for a set of quadratic pump curve models is shown in Table 4.

TABLE 4

Quadratic Pump Curve Model Coefficients

| Pump Combination | $a_{mpx}$ | $b_{mpx}$ | $c_{mpx}$ |
|---|---|---|---|
| P1 | −0.00722 | 0.446036 | 590.0 |
| P1_P2 | −0.0018 | 0.223018 | 590.0 |
| P1_P3 | −0.0008 | 0.148679 | 590.0 |
| P1_P4 | −0.00045 | 0.111509 | 590.0 |

Figure 5:
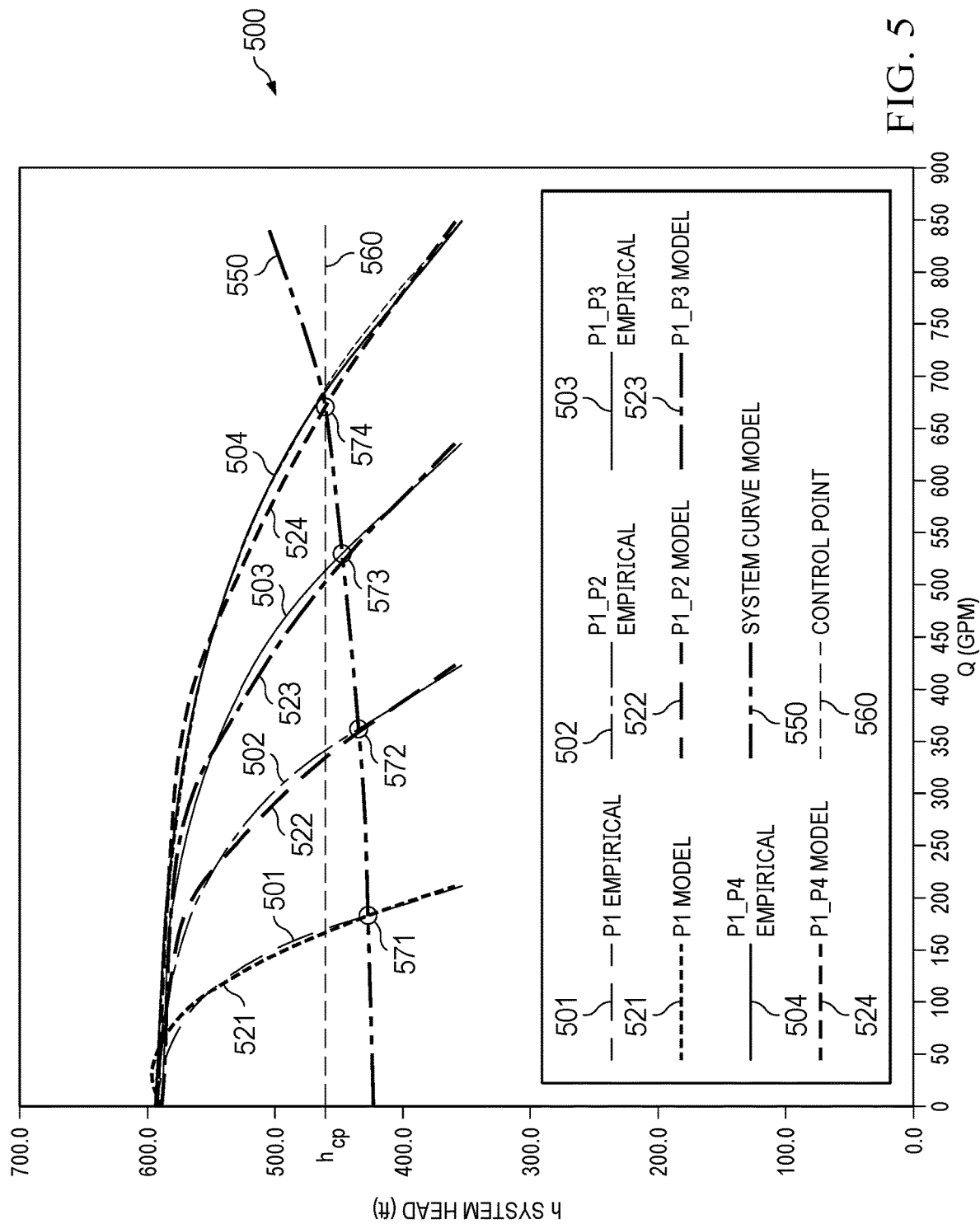
FIG. 5 is a plot of empirical pump performance curves, modeled performance curves, and a modeled system curve of have a preferred embodiment.

Referring then to FIG. 5, plot 500 of a preferred quadratic system curve model, a set of preferred quadratic pump performance curve models and a set of empirical pump performance curves will be further described.

Plot 500 shows flow rate Q versus system head h.

Plot 500 shows empirical curves for pump 1, 501, pumps 1 and 2, 502, pumps 1, 2, and 3, 503, and pumps 1, 2, 3 and 4, 504.

Plot 500 depicts system curve model 550, as predicted by method 400, as previously described.

Similarly, plot 500 shows the modeled pump curve for pump 1, 521, the modeled pump curve for pumps 1 and 2, 522, the modeled pump curve for pumps 1, 2, and 3, 523, and the model pump curve for pumps 1, 2, 3 and 4, 524, as predicted by method 450, as previously described.

Plot 500 further depicts head control point, "$h_{cp}$", 560, in this example 475 feet.

Plot 500 further shows operating points 571, 572, 573 and 574. The operating points shown indicate where the quadratic pump curve models intersect the quadratic system curve model for each pump combination. The quadratic system curve model shows the static head of the system, which is required to overcome gravity at zero flow and the dynamic head, which is the frictional loss at various flow rates. The quadratic pump curve models indicate the head generated by the specific groups of pumps at a rate of flow from zero to the maximum operating frequency.

By way of comparison, it should be noted that the operating points 571, 572, 573, and 574 are different from and below operating points 201, 202, 203, and 204, respectively, as shown in FIG. 2A. This difference is important because when these curves are implemented by the controller, as will be further described, each of the pump combinations is activated at a lower pressure than in the prior art, but at a more efficient frequency, thereby saving energy, because the actual system head, in each case, is lower than what the straight line control point dictates, thereby reducing the amount of energy required to meet the flow rate requirements of the system.

Figure 6A:
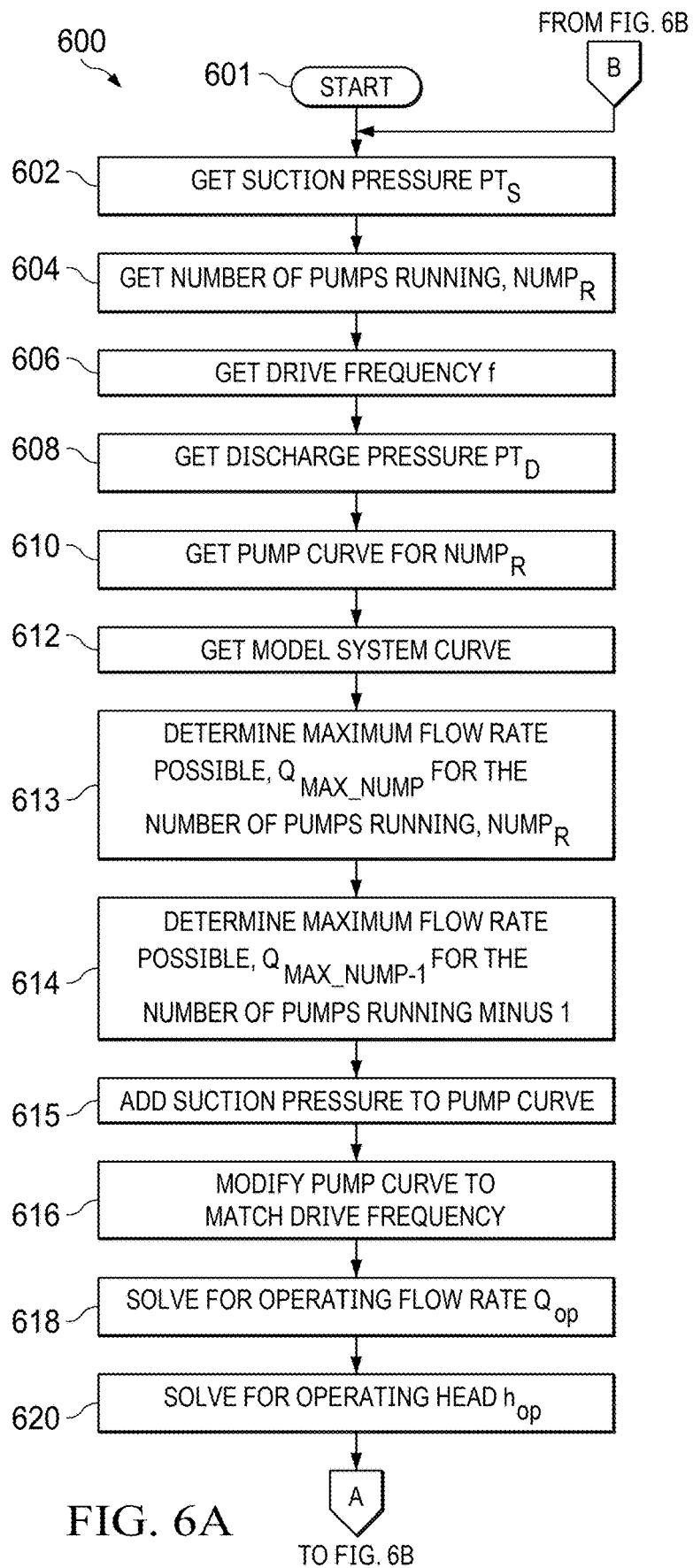
FIGS. 6A and 6B is a flow chart of a preferred control algorithm.
Figure 6B:
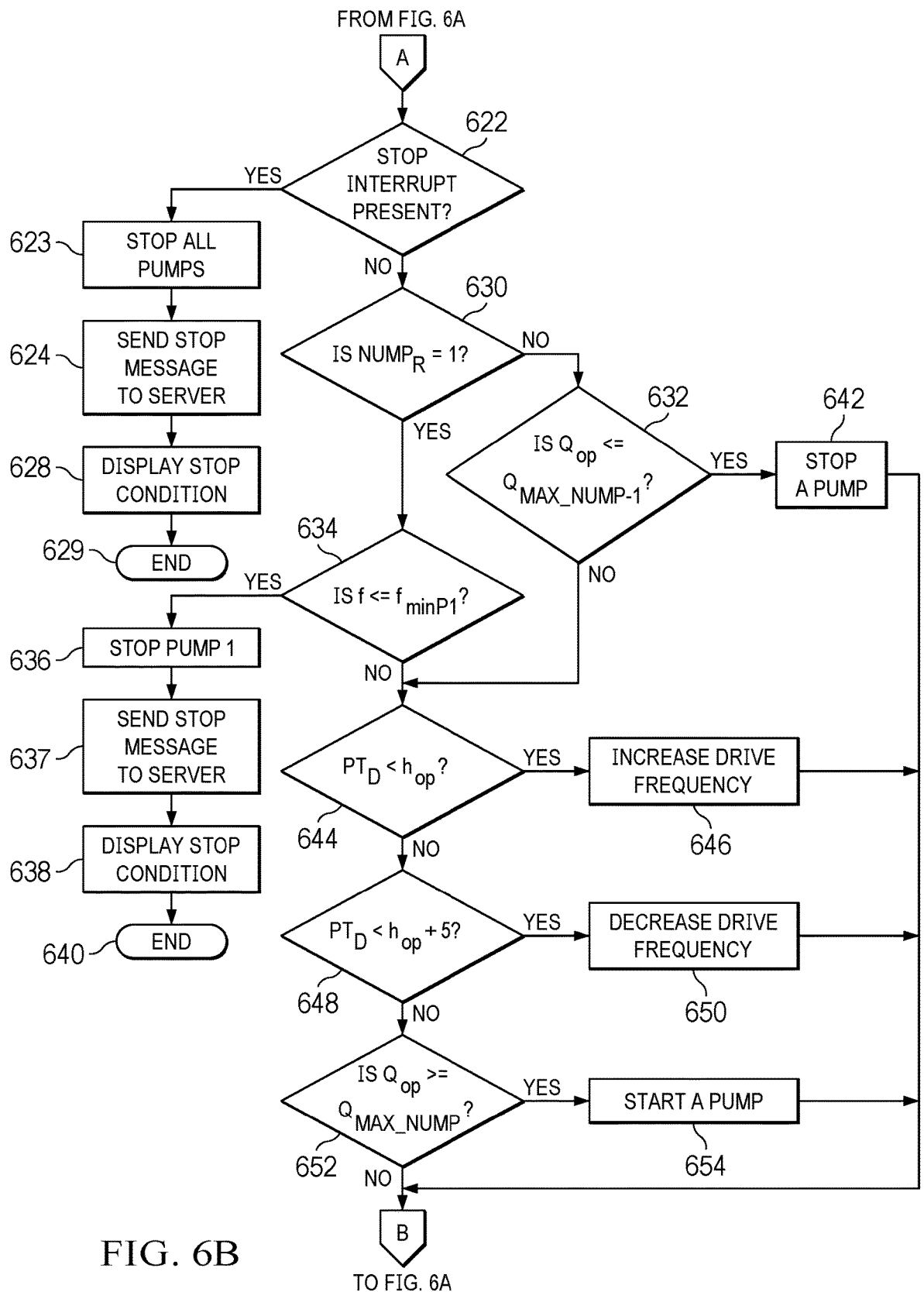

Referring then to FIGS. 6A and 6B, the control algorithm 600, as implemented in step 308 will be further described. In a preferred embodiment the control algorithm is resident as computer code stored in memory 122. Controller 120 accesses memory 122 to execute the control algorithm to drive pump system 104.

At step 601, the method begins.

At step 602, the controller retrieves the current suction pressure "$PT_s$" from meter 103.

At step 604, the controller determines the number of pumps running, "$NUMP_R$" in pump system 104. Preferably, $NUMP_R$ takes on a value of 0-4, "0" indicating all pumps stopped, "1" indicating pump 1 running, "2" indicating pumps 1 and 2 running, "3" indicating pumps 1, 2 and 3 running, and "4" indicating pumps 1, 2, 3 and 4 running. Of course, the maximum number can vary depending on the number of pumps in the system.

At step 606, the controller determines the current drive frequency, f, generated by system signal generator 128. In this embodiment, all pumps in the pump system are driven at the same frequency, generally between about 50 Hz and about 60 Hz.

At step 608, the controller retrieves the discharge pressure, $PT_D$, from meter 107.

At step 610, the controller retrieves the quadratic equation coefficients $a_{mpx}$, $b_{mpx}$ and $c_{mpx}$ from the quadratic coefficient table for the pump curve model corresponding to the number of pumps running, $NUMP_R$.

At step 612, the controller retrieves the quadratic coefficients $a_{sc}$ and $c_{sc}$ from the quadratic coefficient table, for the quadratic system curve model from memory. The coefficients may be stored in the memory or be programmed from the server.

At step 613, the controller determines the maximum flow rate possible, $Q_{max\_NUMP}$, for the number of active pumps, $NUMP_R$. In one embodiment, the maximum flow rate of the active pumps is determined by the following equation;

$$Q_{max\_NUMP} = Q_{max} \times NUMP_R$$

Where:
$Q_{max\_NUMP}$=maximum flowrate for active pumps;
$Q_{max}$=flow rate of pump 1 at maximum drive frequency $f_{max}$, assuming all the pumps in the system are the same; and
$NUMP_R$=the number of active pumps.

At step 614, the controller determines the maximum flow rate possible $Q_{max\_NUMP-1}$ for one less than the number of pumps running. In one embodiment, the maximum flow rate possible for one less than the number of active pumps running is determines by the following equation;

$$Q_{max\_NUMP-1} = Q_{max} \times (NUMP_R - 1)$$

Where:
$Q_{max\_NUMP-1}$=maximum flowrate for 1 less than the number of active pumps;
$Q_{max}$=flow rate of pump 1 at maximum drive frequency $f_{max}$, assuming all the pumps in the system are the same; and
$NUMP_R$=the number of active pumps.

At step 615, the controller adds the suction pressure, $PT_s$ to the pump curve model. In one embodiment, the suction pressure is simply added to the quadratic coefficient "$c_{mpx}$" for the pump combination, determined by the number of pumps running $NUMP_R$, according to the following equation:

$$h_{op} = a_{mpx}Q_0^2 + b_{mpx}Q_0^2 + (c_{mpx} + PT_s)$$

Where:
$h_{op}$=operating head pressure;
$a_{mpx}$, $b_{mpx}$, $c_{mpx}$=pump curve model coefficients for pump combination x;
$Q_{op}$=operating flow rate; and
$PT_s$=suction pressure.

At step 616, the controller "modifies" the quadratic pump performance curve model to match the drive frequency, using the pump affinity laws, as will be further described.

At step 618, the controller solves for the operating flow rate, "$Q_{op}$", as will be further described.

At step 620, the controller solves for the operating head, "$h_{op}$", as will be further described.

At step 622, the controller poles keypad 123 and server 126, to determine whether or not a stop interrupt is present. If not, the controller moves to step 630. If so, the controller moves to step 623.

At step 623, the controller stops all active pumps.

At step 624, a "stop" message is sent to the server.

At step 628, the controller displays a stop condition indicator on display 124.

At step 629, the controller ends the routine.

At step 630, the controller determines whether or not the number of pumps running, $NUMP_R$, is equal to one. If so, the method moves to step 634. If not, the method moves to step 632.

At step 632, the controller determines whether or not the operating flow rate, "$Q_{op}$" is less than or equal to the maximum flow rate possible for the number of pumps running minus one, $Q_{max\_NUMP-1}$. If so, the method moves to step 642. If not, the controller moves to step 644.

At step 642, the controller stops a pump, as will be further described.

Returning to step 634, the controller determines whether or not the drive frequency, "f", is less than or equal to the minimum drive frequency available, "$f_{min}$". If so, the method moves to step 636. If not, the method moves to step 644.

At step 636, the controller stops pump 1.

At step 637, a "stop" message is sent to the server.

At step 638, the controller displays a stop condition indicator on display 124.

At step 640, the controller ends the routine.

At step 644, the controller determines whether or not discharge pressure, "$PT_d$" is less than the operating head, "$h_{op}$". If so, the controller moves to step 646. If not, the controller moves to step 648.

At step 646, the controller increases the drive frequency, "f", as will be further described.

At step 648, the controller determines whether or not the discharge pressure, $PT_d$, is greater than the operating head, $h_{op}$, plus an error factor. Preferably, the error factor is about 5 ft. If so, the controller moves to step 650. If not, the controller moves to step 652.

At step 650, the controller decreases the drive frequency "f", as will be further described.

At step 652, the controller determines whether or not the operating flow rate, "$Q_{op}$" is greater than or equal to the maximum flow rate possible for the number of pumps running, "$Q_{max\_NUMP}$." If so, the controller moves to step 654. If not, the controller returns to step 602.

At step 654, the controller turns on an additional pump, as will be further described, and then returns to step 602.

Figure 7:
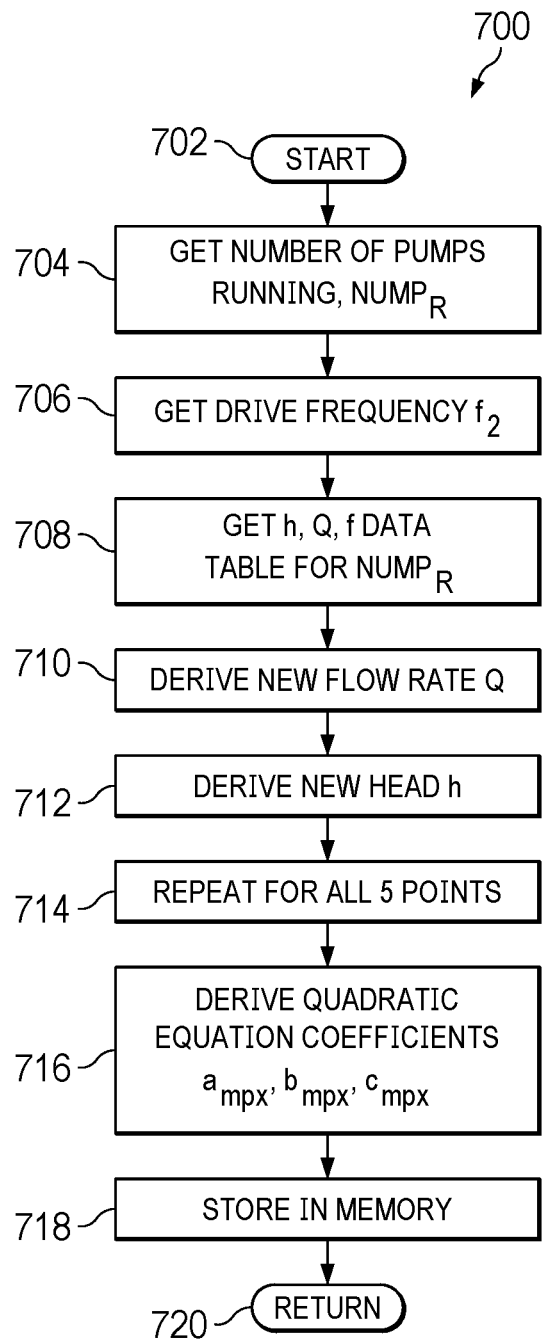
FIG. 7 is a preferred method of modifying a pump performance curve.

Referring to FIG. 7, preferred method 700 of modifying the quadratic pump curve model to match drive frequency implemented at step 616 will be further described.

At step 702, the method begins.

At step 704, the controller retrieves the number of pumps running, $NUMP_R$

At step 706, the controller polls signal generator 128 to determine the drive frequency "$f_1$".

At step 708, the controller retrieves the empirical data table for the pump performance curve corresponding to the number of pumps running. In a preferred embodiment, the data table is provided by the manufacturer for each pump combination and has been stored in memory. Also, preferably, the data table has been reduced to five exemplary data points on the curve. Typically, the data points are drawn from about 20% equal intervals through the data set.

At step 710, the controller derives the new flow rate "$Q_2$" using the following the pump affinity laws:

$$Q_2 = Q_1\left(\frac{f_2}{f_1}\right)$$

Where:
$Q_2$=the new flow rate;
$Q_1$=the flow rate from the data table;
$f_2$=the drive frequency from the data table; and
$f_1$=the current drive frequency.

At step 712, the controller derives the new head pressure $h_2$ using the following equation following the pump affinity laws:

$$h_2 = h_1\left(\frac{f_2}{f_1}\right)^2$$

Where:
$h_2$=new head pressure;
$h_1$=head pressure from the data table;
$f_2$=the drive frequency from the data table; and
$f_1$=the current drive frequency.

At step 714, the controller repeats steps 710 and 712 for each of the five points on the curve from the empirical data table. The result is five points that define a new empirical pump performance curve shifted to match the new drive frequency.

At step 716, the controller derives the quadratic equation coefficients $a_{mpx}$, $b_{mpx}$, and $c_{mpx}$ for the new empirical pump performance curve developed in step 714, according to a curve fit routine, as previously described. The quadratic equation coefficients define the quadratic pump performance curve model, which matches are used to pump the new drive frequency. In another preferred embodiment, this calculation is accomplished at the server, with the results communicated to the controller.

At step 718, the controller stores the quadratic equation coefficients $a_{mpx}$, $b_{mpx}$, and $c_{mpx}$ for the number of pumps running, x, in memory.

At step 720, the method returns.

Figure 8:
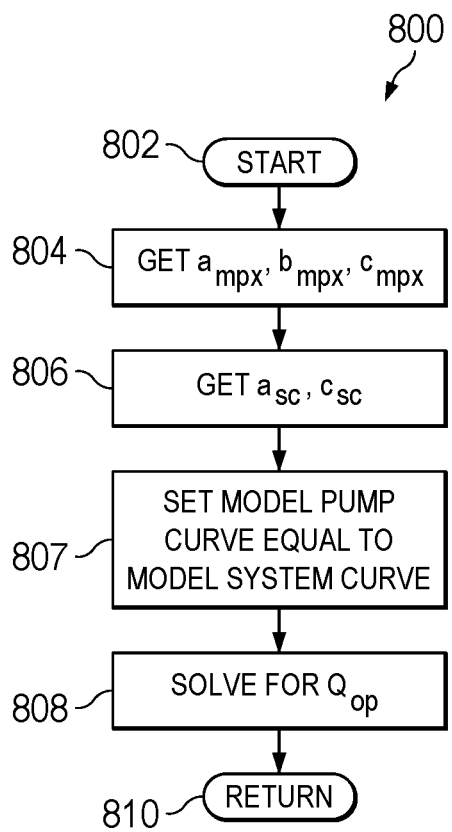
FIG. 8 is a flow chart of the preferred method of solving for an operating flow rate.

Referring to FIG. 8, preferred method 800 of solving for operating flow rate $Q_{op}$, as implemented at step 618, will be further described.

At step 802, the method begins.

At step 804, the controller retrieves the values of the quadratic equation coefficients for the quadratic pump performance curve model, $a_{mpx}$, $b_{mpx}$, and $c_{mpx}$ for the number of pumps running, x, from memory.

At step 806, the controller retrieves the quadratic equation coefficients for the quadratic system curve model, $a_{sc}$, and $c_{sc}$, from memory.

At step 808, the controller sets the pump performance curve model for the number of pumps running in the system equal to the system curve model for the system as shown in the following equation:

$$a_{mpx}Q_{op}^2 + b_{mpx} + c_{mpx} = a_{sc}Q_{op}^2 + c_{sc}$$

Where:
$Q_{op}$=operating flow rate;
$a_{mpx}$, $b_{mpx}$, $c_{mpx}$=quadratic coefficients for pump curve model for pump combination x; and
$a_{sc}$, $c_{sc}$=quadratic coefficients for system curve model.

At step 807, the controller solves for $Q_0$ according to the following equation.

$$Q_{op} = \frac{-b_{mpx} \pm \sqrt{b_{mpx}^2 - 4[(a_{mpx} - a_{sc})(c_{mpx} - c_{sc})]}}{2(a_{mpx} - a_{sc})}$$

Where:
$Q_{op}$=operating flow rate;
$a_{mpx}$, $b_{mpx}$, $c_{mpx}$=quadratic coefficients for pump curve model for pump combination x; and
$a_{sc}$, $c_{sc}$=quadratic coefficients for system curve model.

At step 810, the controller returns.

Figure 9:
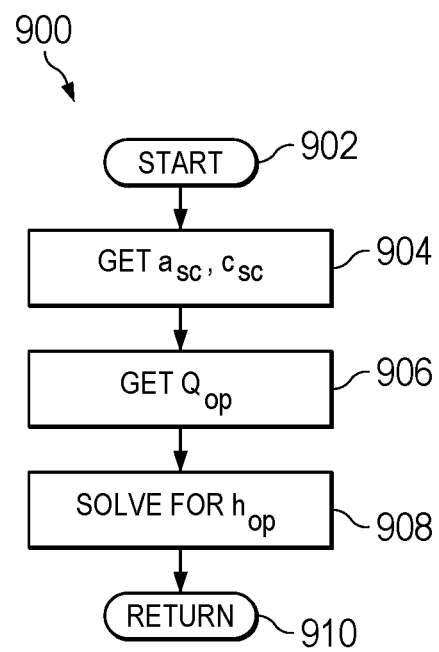
FIG. 9 is a flow chart of a preferred method of solving for operating head.

Referring to FIG. 9, preferred method 900 of solving for operating head, $h_{op}$, as implemented in step 620, will be further described.

At step 902, the method begins.

At step 904, the controller retrieves the quadratic equation coefficients, $a_{sc}$, $c_{sc}$ for the quadratic system curve model from memory.

At step 906, the controller retrieves the value of operating flow rate, "$Q_{op}$" from memory.

At step 908, the controller solves for the operating head, $h_0$, according to the following equation.

$$h_{op} = a_{sc}Q_{op}^2 + c_{sc}$$

Where:
$h_{op}$=operating head pressure;
$Q_{op}$=operating flow rate; and
$a_{sc}$ and $c_{sc}$=quadratic coefficients for quadratic system curve model.

At step 910, the method returns.

Figure 10:
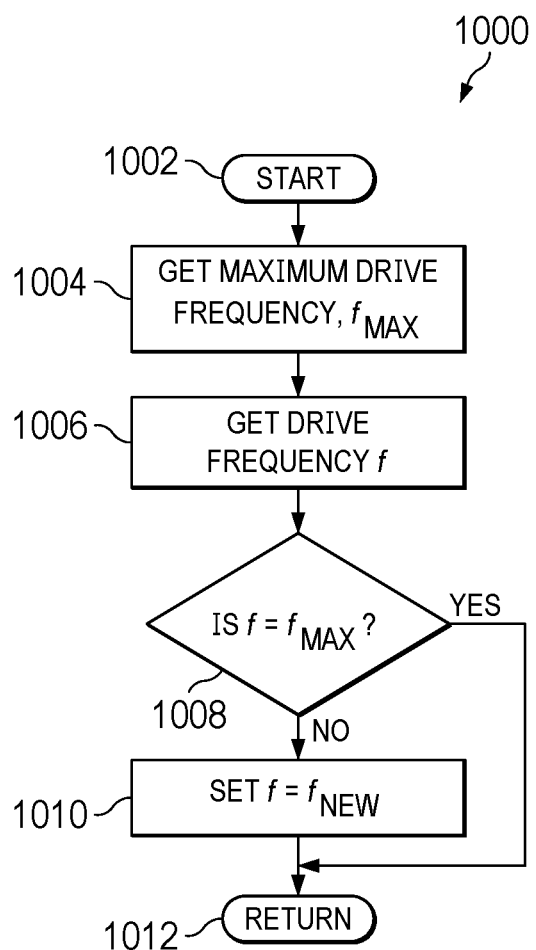
FIG. 10 is a flow chart of a preferred method of decreasing a drive frequency.

Referring to FIG. 10, the preferred method 1000 of increasing drive frequency, as implemented at step 646, will be further described. In a preferred embodiment, all pumps are driven at the same drive frequency. The minimum drive frequency is usually about 52 Hz. The maximum drive frequency is usually about 60 Hz.

At step 1002, the method begins. At step 1004, the controller retrieves the maximum drive frequency, $f_{max}$.

At step 1006, the controller retrieves the current drive frequency, "f," for the active pumps.

At step 1008, the controller determines whether or not the current drive frequency "f" is equal to the maximum drive frequency, $f_{max}$. If not, the controller moves to step 1010. If so, the controller moves to step 1012.

At step 1010, controller raises the current frequency according to the following equation.

$$f_{new} = f_{current} + (0.1)f_{max}$$

Where:
$f_{new}$=new drive frequency for all active pumps;
$f_{current}$=current drive frequency for all active pumps; and
$f_{max}$=maximum drive frequency.

Those of skill will recognize that increasing the drive speed in small incremental steps increases efficiency in the system.

At step 1012, the controller returns.

Figure 11:
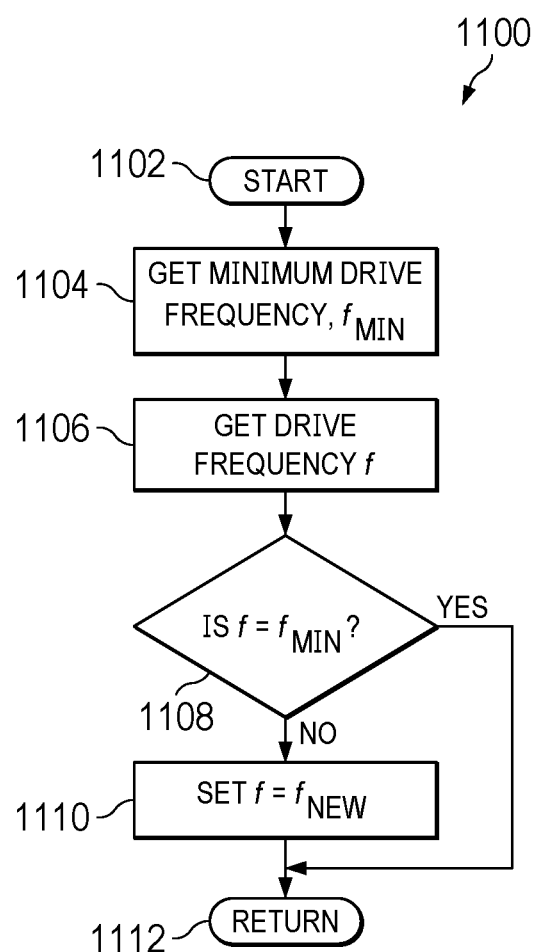
FIG. 11 is a flow chart of a preferred method of increasing a drive frequency.

Referring to FIG. 11, the preferred method 1100 of decreasing drive frequency, as implemented at step 650, will be further described. In a preferred embodiment, all pumps are driven at the same drive frequency. The minimum drive frequency is usually about 52 Hz. The maximum drive frequency is usually about 60 Hz.

At step 1102, the method begins. At step 1104, the controller retrieves the minimum drive frequency, $f_{min}$.

At step 1106, the controller retrieves the current drive frequency, "f", for the active pumps.

At step 1108, the controller determines whether or not the current drive frequency "f" is equal to the minimum drive frequency $f_{min}$. If not, the controller moves to step 1010. If so, the controller moves to step 1112.

At step 1110, controller raises the current frequency according to the following equation.

$$f_{new} = f_{current} - (0.1)f_{max}$$

Where:
$f_{new}$=new drive frequency for all active pumps;
$f_{current}$=current drive frequency for all active pumps; and
$f_{max}$=maximum drive frequency.

Those of skill will recognize that decreasing the drive speed in small incremental steps increases efficiency in the system.

At step 1112, the controller returns.

Figure 12:
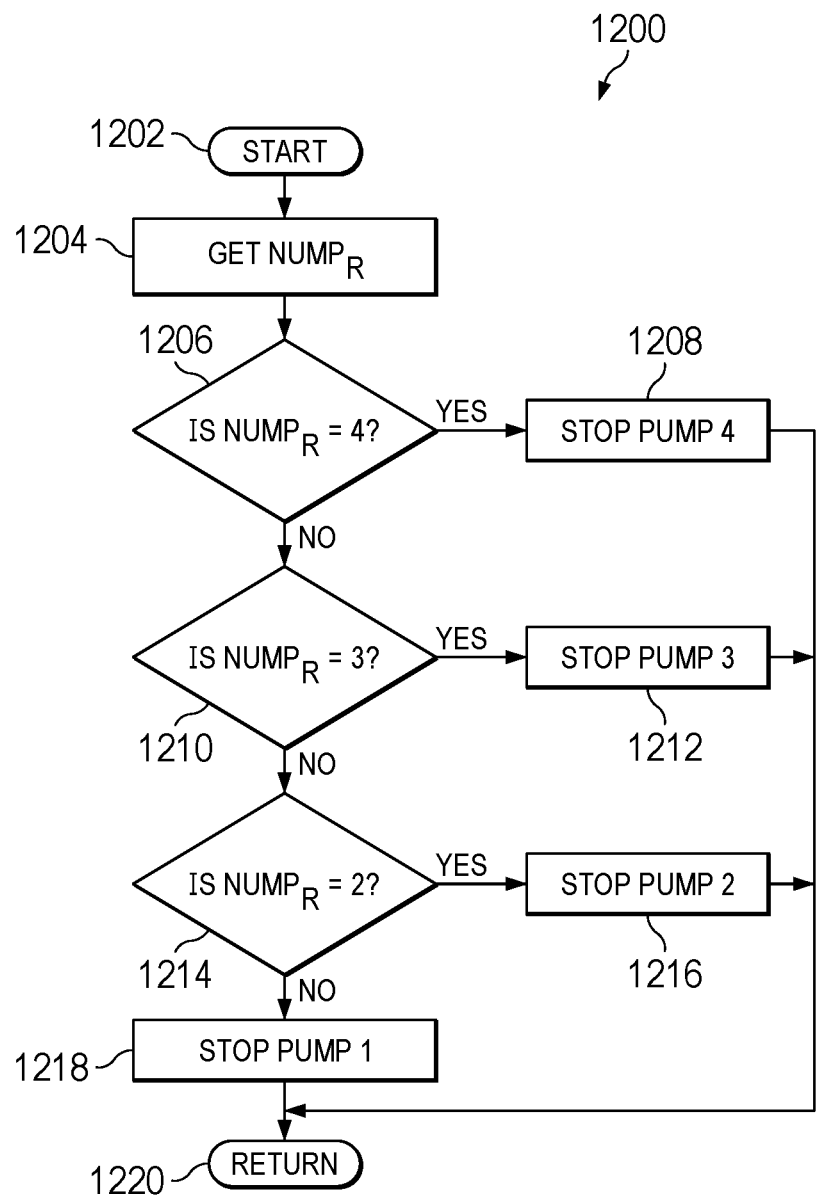
FIG. 12 is a flow chart of a preferred method of stopping a pump.

Referring to FIG. 12, preferred method 1200 of stopping a pump, as implemented in step 642, will be further described.

At step 1202, the method begins.

At step 1204, the controller retrieves a value for the number of pumps running, $NUMP_R$.

At step 1206, the controller determines whether or not the number of pumps running, $NUMP_R$, is equal to the maximum number of active pumps. In this example, the maximum number is 4. The algorithm may be expanded to cover a greater maximum number, as will be recognized by those of skill in the art. If so, the controller moves to step 1208. If not, the controller moves to step 1210.

At step 1208, the controller deactivates pump 4 and moves to step 1220.

At step 1210, the controller determines whether or not the number of pumps active, $NUMP_R$, is equal to three. If so, the controller moves to step 1212. If not, the controller moves to step 1214.

At step 1212, the controller deactivates pump 3 and moves to step 1220.

At step 1214, the controller determines whether or not the number of pumps running, $NUMP_R$, is equal to two. If so, the controller moves to step 1216. If not, the controller moves to step 1218.

At step 1216, the controller deactivates pump 2 and moves to step 1220.

At step 1218, the controller deactivates pump number 1.

At step 1220, the method returns.

Figure 13:
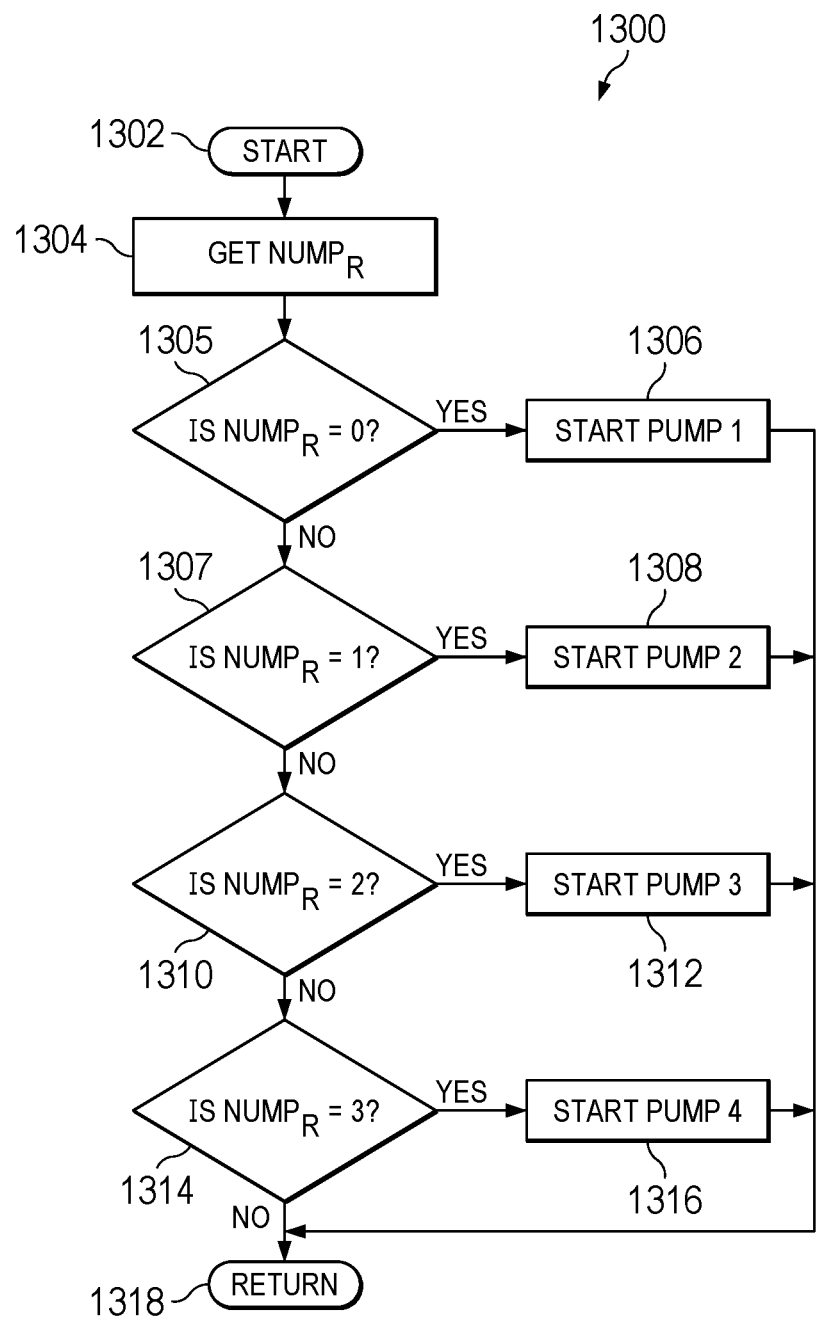
FIG. 13 is a flow chart of a preferred method of starting a pump.

Referring to FIG. 13, preferred method 1300 of starting a pump, as implemented in step 654, will be further described.

At step 1302, the method begins.

At step 1304, the controller retrieves a value for the number of pumps running, $NUMP_R$.

At step 1305, the controller determines whether or not the number of pumps running, $NUMP_R$, is equal to zero. If so, the controller moves to step 1306. If not, the method moves to step 1307.

At step 1306, the controller activates pump 1, and moves to step 1318.

At step 1307, the controller determines whether or not the number of pumps running is equal to one. If so, the controller moves to step 1308. If not, the controller moves to step 1310.

At step 1308, the controller activates pump 2 and moves to step 1318.

At step 1310, the controller determines whether or not the number of pumps active, $NUMP_R$ is equal to two. If so, the controller moves to step 1312. If not, the controller moves to step 1314.

At step 1312, the controller activates pump 3 and moves to step 1318.

At step 1314, the controller determines whether or not the number of pumps running, $NUMP_R$ is equal to three. If so, the controller moves to step 1316. If not, the controller moves to step 1318.

At step 1316, the controller activates pump 4 and moves to step 1318.

At step 1318, the method returns.

The invention claimed is:

1. A controller for operating a pump system for a hydraulic system comprising:
a processor, including a memory;
a signal generator, operatively connected to the processor;
a set of pumps, operatively connected to the signal generator and supplying water to the hydraulic system;
a suction pressure sensor, operatively connected to the hydraulic system and the processor, generating a first pressure signal;
a discharge pressure sensor, operatively connected to the hydraulic system and the processor, generating a second pressure signal;
a set of instructions, stored in the memory, which when executed cause the pump system to implement the steps of:
deriving a quadratic system curve model;
reading the first pressure signal;
deriving a quadratic pump performance curve model;
reading the second pressure signal; and
initiating the quadratic system curve model and the quadratic pump performance curve model, using the first pressure signal and the second pressure signal, to alternatively activate and deactivate a pump, of the set of pumps, to supply the hydraulic system.

2. The controller of claim 1, wherein the step of deriving the quadratic system curve model further comprises:
assuming that a static head and a flow rate through the hydraulic system obey a second order polynomial form.

3. The controller of claim 2, wherein the second order polynomial form is:

$$h_{sc} = a_{sc}Q^2 + c_{sc}$$

where:
$h_{sc}$=a head for the quadratic system curve model;
Q=a flow rate for the hydraulic system; and
$a_{sc}$ and $c_{sc}$=a set of quadratic system curve coefficients.

4. The controller of claim 1, wherein the step of deriving the quadratic pump performance curve model further comprises:
assuming that a head pressure and a flow rate through the set of pumps obey a second order polynomial form.

5. The controller of claim 4, wherein the second order polynomial form is:

$$h_{mp} = a_{mpx}Q^2 + b_{mpx}Q + c_{mpx}$$

where:
$h_{mp}$=a head pressure for the set of pumps;
Q=a flow rate for the set of pumps; and
$a_{mpx}$, $b_{mpx}$, $c_{mpx}$=a set of quadratic coefficients for the set of pumps.

6. The controller of claim 5, wherein the step of deriving the quadratic pump performance curve model further comprises:
deriving the set of quadratic coefficients for a pump combination of the set of pumps.

7. The controller of claim 6, wherein the step of deriving the set of quadratic coefficients further comprises:
deriving the set of quadratic coefficients based on an empirically derived set of pump data.

8. The controller of claim 1, wherein the step of initiating further comprises:
determining a number of active pumps for the set of pumps;
determining a drive frequency for the set of pumps;
retrieving a first set of quadratic equation coefficients, corresponding to the number of active pumps, for the quadratic pump performance curve model;
retrieving a second set of quadratic equation coefficients for the quadratic system curve model;
solving for an operating flowrate;
solving for an operating head;
stopping an active pump, of the set of pumps, if the operating flowrate is less than a maximum flowrate for one less than the number of active pumps; and
starting an inactive pump, of the set of pumps, if the operating flowrate is greater than the maximum flowrate for the number of active pumps.

9. The controller of claim 8, wherein the set of instructions further comprises instructions that when executed cause the controller to implement the step of:
adding a suction pressure to the quadratic pump performance curve model, based on the first pressure signal.

10. The controller of claim 8, wherein the set of instructions further comprises instructions that when executed cause the controller to implement the step of:
modifying the quadratic pump performance curve model, based on the drive frequency.

11. The controller of claim 8, wherein the set of instructions further comprises instructions that when executed cause the controller to implement the step of:
increasing the drive frequency, if the second pressure signal indicates a discharge pressure less than the operating head.

12. The controller of claim 8, wherein the set of instructions further comprises instructions that when executed cause the controller to implement the step of:
decreasing the drive frequency, if the second pressure signal indicates a discharge pressure greater than the operating head plus an error factor.

13. The controller of claim 8, wherein the set of instructions further comprises instructions that when executed cause the controller to implement the step of:
stopping a last active pump of the set of pumps, if the drive frequency is below a preset minimum drive frequency.

14. The controller of claim 8, wherein the step of solving for the operating flowrate further comprises:
setting the quadratic pump performance curve model equal to the quadratic system curve model.

15. The controller of claim 8, wherein the step of solving for the operating head further comprises:
applying the quadratic system curve model in a form of:

$$h_{op} = a_{sc}Q_{op}^2 + c_{sc}$$

where:
$h_{op}$=an operating head pressure;
$Q_{op}$=an operating flow rate; and
$a_{sc}$ and $c_{sc}$=the second set of quadratic equation coefficients.

16. A method for operating a pump system for a hydraulic system comprising:
providing a processor, including a memory;
providing a signal generator, operatively connected to the processor;
providing a set of pumps, operatively connected to the signal generator and supplying water to the hydraulic system;
providing a suction pressure sensor, operatively connected to the hydraulic system and the processor, generating a first pressure signal;
providing a discharge pressure sensor, operatively connected to the hydraulic system and the processor, generating a second pressure signal; and
providing a set of instructions, stored in the memory, which when executed cause the pump system to implement the steps of:
deriving a quadratic system curve model;
reading the first pressure signal;
deriving a quadratic pump performance curve model;
reading the second pressure signal; and
initiating the quadratic system curve model and the quadratic pump performance curve model, using the first pressure signal and the second pressure signal, to alternatively activate and deactivate a pump, of the set of pumps, to supply the hydraulic system.

17. The method of claim 16, wherein the step of deriving the quadratic system curve model further comprises:
assuming that a static head and a flow rate through the hydraulic system obey a second order polynomial form.

18. The method of claim 17, wherein the second order polynomial form is:

$$h_{sc} = a_{sc}Q^2 + c_{sc}$$

where:
$h_{sc}$=a head for the quadratic system curve model;
Q=a flow rate for the hydraulic system; and
$a_{sc}$ and $c_{sc}$=a set of quadratic system curve coefficients.

19. The method of claim 16, wherein the step of deriving the quadratic pump performance curve model further comprises:
assuming that a head pressure and a flow rate through the set of pumps obey a second order polynomial form.

20. The method of claim 19, wherein the second order polynomial form is:

$$h_{mp} = a_{mpx}Q^2 + b_{mpx}Q + c_{mpx}$$

where:
$h_{mp}$=a head pressure for the set of pumps;
Q=a flow rate for the set of pumps; and
$a_{mpx}$, $b_{mpx}$, $c_{mpx}$=a set of quadratic coefficients for the set of pumps.

21. The method of claim 20, wherein the step of deriving the quadratic pump performance curve model further comprises:
deriving the set of quadratic coefficients for a pump combination of the set of pumps.

22. The method of claim 21, wherein the step of deriving the set of quadratic coefficients further comprises:
deriving the set of quadratic coefficients based on an empirically derived set of pump data.

23. The method of claim 16, wherein the step of initiating further comprises:
determining a number of active pumps for the set of pumps;
determining a drive frequency for the set of pumps;
retrieving a first set of quadratic equation coefficients, corresponding to the number of active pumps, for the quadratic pump performance curve model;
retrieving a second set of quadratic equation coefficients for the quadratic system curve model;
solving for an operating flowrate;
solving for an operating head;
stopping an active pump, of the set of pumps, if the operating flowrate is less than a maximum flowrate for one less than the number of active pumps; and
starting an inactive pump, of the set of pumps, if the operating flowrate is greater than the maximum flowrate for the number of active pumps.

24. The method of claim 23, wherein the step of providing the set of instructions further comprises providing instructions that when executed cause the pump system to implement the step of:
adding a suction pressure to the quadratic pump performance curve model, based on the first pressure signal.

25. The method of claim 23, wherein the step of providing the set of instructions further comprises providing instructions that when executed cause the pump system to implement the step of:
modifying the quadratic pump performance curve model, based on the drive frequency.

26. The method of claim 23, wherein the set of instructions further comprises instructions that when executed cause the pump system to implement the step of:
increasing the drive frequency, if the second pressure signal indicates a discharge pressure less than the operating head.

27. The method of claim 23, wherein the step of providing the set of instructions further comprises providing instructions that when executed cause the pump system to implement the step of:
decreasing the drive frequency, if the second pressure signal indicates a discharge pressure greater than the operating head plus an error factor.

28. The method of claim 23, wherein the step of providing the set of instructions further comprises providing instructions that when executed cause the pump system to implement the step of:
stopping a last active pump of the set of pumps, if the drive frequency is below a preset minimum drive frequency.

29. The method of claim 23, wherein the step of solving for the operating flowrate further comprises:
setting the quadratic pump performance curve model equal to the quadratic system curve model.

30. The method of claim 23, wherein the step of solving for the operating head further comprises:
applying the quadratic system curve model in a form of:

$$h_{op} = a_{sc}Q_{op}^2 + c_{sc}$$

where:
$h_{op}$=an operating head pressure;
$Q_{op}$=an operating flow rate; and
$a_{sc}$ and $c_{sc}$=the second set of quadratic equation coefficients.

* * * * *